June 9, 1931.  P. V. MORGAN  1,809,388
TIRE CHANGER
Filed Nov. 1, 1928   2 Sheets-Sheet 1

Inventor
Purley V. Morgan
By Popp + Powers
Attorneys

June 9, 1931.  P. V. MORGAN  1,809,388
TIRE CHANGER
Filed Nov. 1, 1928   2 Sheets-Sheet 2
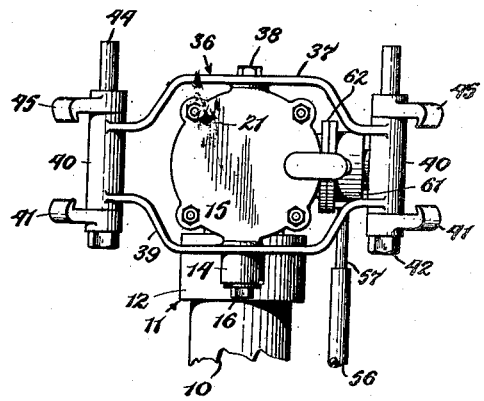
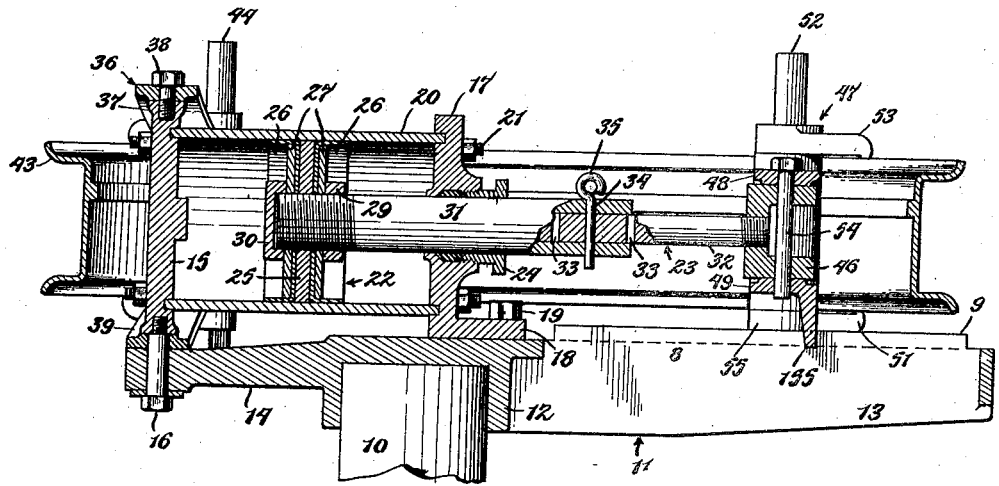
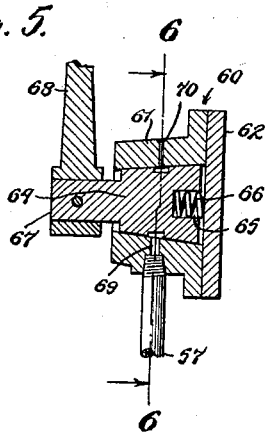
Inventor
Purley V. Morgan
By Pozpr Powers
Attorneys Patented June 9, 1931

1,809,388

UNITED STATES PATENT OFFICE

PURLEY V. MORGAN, OF BUFFALO, NEW YORK, ASSIGNOR, BY MESNE ASSIGNMENTS, TO PNEUMATIC APPLIANCES, INC., OF KENMORE, NEW YORK, A CORPORATION OF NEW YORK

TIRE CHANGER

Application filed November 1, 1928. Serial No. 316,450.

This invention relates to an air pressure actuated tire changer and more particularly to a machine for expanding and controlling the split metal demountable rim of an automobile tire, for the purpose of removing or replacing a tire thereon, although the same can also be employed wherever a machine is required to contract or expand an annular member or the like at the will of the operator.

One of the objects of this invention is to provide such a device which is operated by air pressure, a source of which is generally available in garages in the tank for storing air for filling tires, and in which the operation of the machine in contracting or expanding the rim is under the control of a single valve which is designed so that at any time the movement of the machine can be arrested or reversed at the will of the operator.

Another aim is to provide such a machine in which the tire rim engaging elements are so arranged that the rim can be thrown on the machine and the same immediately contracted by manipulation of the air valve without requiring special or careful placement of the rim and in which the tire engaging elements are flexibly mounted and engage the rim at different points so that a firm grip or engagement is obtained on the rim and at the same time the elements give or yield so that there is no danger of distorting or buckling the rim during either the contracting or expanding movement of the machine.

A further aim is to render the machine easily and quickly adjustable to different sized rims without the provision of a piston having an excessive throw such adjustable means in the present application being shown as an extensible piston rod so that very large and very small rims can be effectively expanded or contracted to remove or replace the tire.

Another object is to provide a valve for admitting pressure to one side of the piston and exhausting the pressure on the opposite side and in which the exhaust of pressure from one side of the piston is subsequent to the admission of pressure to the opposite side so that the movement of the piston is controlled through the exhaust and the piston is cushioned on opposite sides by air pressure, the movement being obtained by the differential in the pressure. By this means the piston works smoothly and is under the complete control of the operator at all times so that there is little danger of injuring the rim through too rapid and uncontrolled operation of the piston.

Other aims are to provide a device which is extremely simple to operate, which is inexpensive in construction, and is composed of but few parts, which parts are so arranged as not to get out of order readily even when subjected to severe and constant use.

In the accompanying drawings:

Figure 3 is an end view of the machine showing the tire and rim removed.

Figure 4 is a vertical longitudinal section, taken on line 4—4, Fig. 2.

Figure 5 is a vertical transverse section through the controlling valve.

Figure 6 is a cross section of the valve, taken on line 6—6, Fig. 5.

Similar reference numerals refer to like parts in each of the several views.

Figure 1:
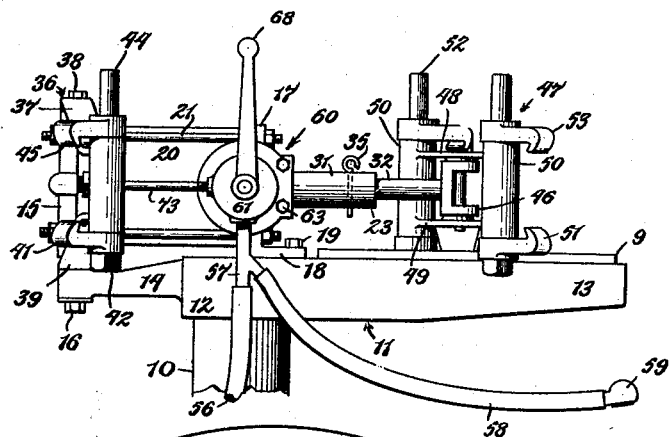
Figure 1 is a side elevation of a tire changer embodying my invention and showing a part of the standard broken away.

In its general organization, this machine comprises a horizontal enclosed stationary cylinder having a piston and a piston rod, a hand valve which admits and exhausts air alternately to and from opposite ends of the cylinder and through the exhaust controls the movement of the piston in opposite directions and a pair of cross heads pivoted at their centers for horizontal movement, one of said cross heads being mounted on the outer cylinder head and the other on the end of the piston rod and each having shoulders and hooks at its outer ends to engage and expand or contract the tire rim. By the provision of these cross heads, the same yield and adjust themselves to the changing form of the tire rim as it is contracted and expanded and prevent distortion of the same. The piston rod is also made adjustably telescopic so that it can be adjusted to any desired size of tire rim.

The machine is shown as mounted on a tubular standard or pedestal 10 which is supported on the floor in any suitable manner and at its upper end carries a bed 11 which is secured to the pedestal in any suitable manner. This bed comprises a cap portion 12 which receives the upper end of the pedestal, a relatively long horizontally extending guiding arm 13, having a slot 8 and ridges or rails 9 on opposite sides of said slot, and a horizontal bracket 14 which extends in the opposite direction relative to the guiding arm 13.

The cylinder is composed of an outer head 15 which is secured to the end of the bracket 14 by a bolt 16, a front head 17 having an outwardly projecting foot 18 which is secured to the bed by bolts 19, and a cylinder 20 which is secured to the end heads 15 and 17 by means of tie bolts 21. Any suitable means can be provided for insuring a tight joint between the heads and cylinder.

Within the cylinder is arranged a piston 22 and a piston rod 23 which is secured to the piston and extends outwardly through a gland or stuffing box 24 in the cylinder head 17. The piston as shown is composed of a circular head 25 on opposite sides of which two cup washers 26 are held by washers 27 and nuts 29 and 30. These nuts are screwed onto the end of the piston rod and also serve to secure the piston to the piston rod.

The piston rod 23 is composed of a tubular section 31 which is closed at its inner end by the cap nut 30 and a solid rod 32 which is slidingly received in the tubular section 31 so as to provide a telescoping piston rod. The inner rod 32 is provided with a series of holes 33 extending therethrough and the outer tubular section is provided with a hole 34 which is adapted to register with each of the holes 33. To hold the piston rod at any desired adjustment in length a pin 35 is provided which is adapted to be dropped through the registering holes 33 and 34 and hold the piston rod at any desired adjusted length.

By this means the piston rod can be extended to operate on rims of large diameter, and avoids the necessity of providing a long cylinder which would interfere with the operation of the machine on very small rims.

On the rear or outer cylinder head 15 a cross head 36 is pivotally mounted at its center for horizontal movement. This cross head comprises an upper arm 37 which is pivoted to the top of the cylinder head by a bolt 38, a lower arm 39 pivotally mounted on the bolt 16 between the supporting bracket 14 and the rear cylinder head, and cylindrical end portions or shoulders 40 connecting the ends of the arms 37 and 39.

To the lower end of each of these cylindrical end portions or shoulders 40 a hook 41 is secured by means of a bolt 42, these hooks extending horizontally outward and having upturned ends to engage the lower flange of the rim 43. For the purpose of providing auxiliary hooks to engage the upper flange of the rim 43 when unusually large rims are being operated on, and thereby prevent distortion of the rim in contracting the same, pins 44 rise from the ends of the cross head and on these pins are loosely and removably mounted hooks 45 which have under turned ends adapted to engage the upper flange of the rim.

On the outer end of the telescoping section 32 of the piston rod a block 46 is secured and to this block is pivotally secured a cross head 47 which is similar in form to the rear cross head 36, having upper and lower arms 48 and 49, cylindrical end abutment members 50 connecting the arms 48 and 49 and formed integrally therewith, lower upturned hooks 51 secured to the under side of the head at the outer ends thereof and upwardly extending pins 52 which removably carry under turned hooks 53 which grip the upper flange of large rims in contracting the same.

The cross head is pivotally mounted on the block 46 by a vertical bolt 54. In order to guide the cross head 47 in the slot 8 in the bed, and support this cross head, the lower arm 49 is provided with a shoe 55 which rests on the guide rails 9 and has a downward projection 155 which is arranged between the rails 9 and prevents lateral movement of the end of the piston rod and the cross head.

Air to the cylinder is supplied to the cylinder from a supply line 56, which is secured to a suitable Y pipe 57 to the other branch of which is secured a line 58 having a tire inflating valve head 59 at its end. By this means, when the tube or shoe of the tire has been repaired and replaced on the rim by means of the present machine, the tire is conveniently inflated from the branch line 58.

The Y fitting connects with the controlling valve 60. This valve comprises a casing or housing 61 which is secured to a vertical bracket 62 by means of bolts 63, this last named bracket being supported by and formed integrally with the head 17 of the cylinder. The inner surface of this valve casing is of conical form and receives a conical valve plug 64. As best shown in Fig. 5, this plug is provided with a central recess 65 which receives a compression spring 66, this spring bearing against the face of the bracket 62 and urging the plug 64 outwardly against its conical seat. At the front end of the plug 64 a stem 67 is provided which extends outwardly from the casing and supports the handle 68 by means of which the plug is turned.

The Y fitting through which air pressure is supplied to the valve 60 connects with an inlet port 69 in the lower end of the valve casing. Diametrically opposite or on the upper side of the valve casing a restricted exhaust port 70 is provided which permits the escape of air at a restricted rate.

On diametrically opposite sides of the valve housing, outlet ports 71 and 72 are provided, the port 71 being connected by a pipe 73 with the rear end of the cylinder and the port 72 being connected by a passage in the cylinder head 17 (not shown) with the interior of the cylinder at the inner end thereof. To connect these ports and regulate the pressure at opposite ends of the cylinder to move the piston in any desired direction or hold it in any desired position, an inlet groove 74 is provided in the lower part of the plug 64 and is arranged to alternately connect the inlet port 69 with the outlet ports 71 and 72 and on the opposite side of the plug an exhaust groove 75 is provided which is adapted to alternately connect the exhaust port 76 with the outlet ports 71 and 72. It is apparent that when the exhaust groove 75 connects with the outlet port 71, that the air inlet groove 74 will be connected with the outlet port 72, thereby to move the piston rearwardly and contract the rim, and vice versa, and in the inoperative position of the valve, shown in Fig. 6, that pressure is neither admitted to nor exhausted from the cylinder and hence the piston is held in the position at which it was arrested by turning the valve to neutral. It will also be noted that the inlet groove 74 is longer than the exhaust groove 75. By this means, assuming that it is desired to move the piston forwardly, the valve handle is moved counter clockwise and the air pressure inlet groove first registers with the port 71 to admit pressure to the rear end of the cylinder and balance the pressure in the front end. Thereafter the exhaust groove 75 registers with the port 72 and permits air to escape from the front end of the cylinder and the piston to be moved forwardly. By the restriction of the exhaust port 70, the air escapes at a restricted rate and consequently the piston moves relatively slowly and uniformly and is cushioned throughout its movement so that there is little danger of an inexperienced operator injuring the rim by too rapid operation of the machine.

Assuming that it is desired to remove a tire and tube from a split rim to repair the same, the rim is thrown on the machine so that the back of the rim, or the part opposite the split rests on the rear hooks 42, and the opposite part of the rim and tire rest on the outer end of the guiding arm 13. If the tire rim is of unusually large diameter, the pin 34 in the piston rod is then withdrawn and the piston rod extended as desired, the pin 34 being then replaced to hold the piston rod at the desired length.

Figure 2:
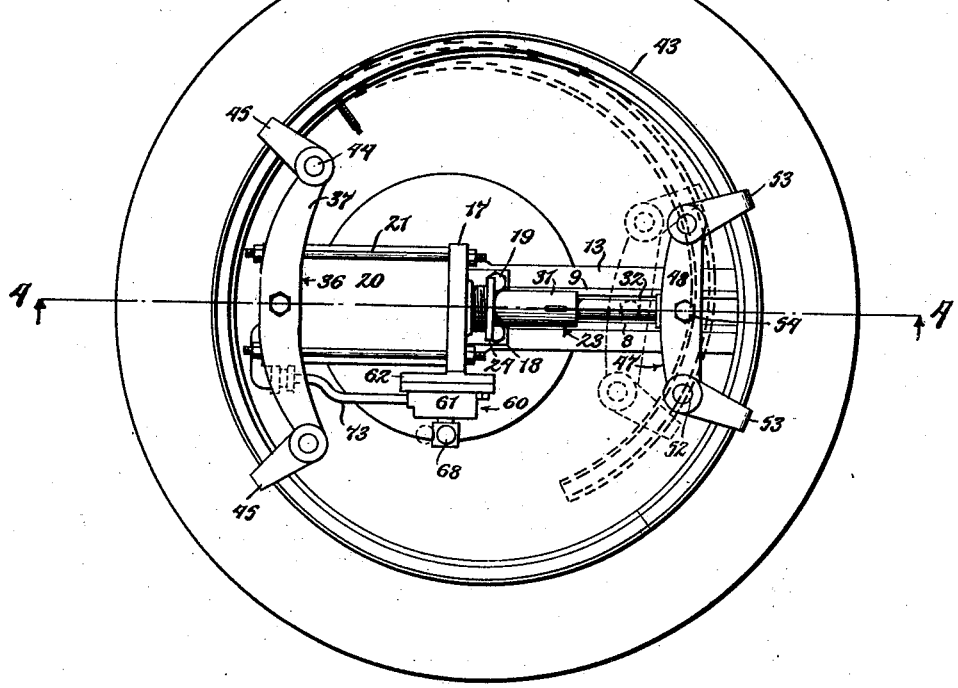
Figure 2 is a top plan view thereof showing a tire rim about to be contracted from the tire, the contracted position of the rim being shown by dotted lines.

The handle of the valve 60 is then turned clockwise which first admits air to the outer end of the cylinder and then permits a restricted exhaust of air from the inner end thereof. This exhaust of pressure moves the piston inwardly and moves the head 47 against the tire rim. As soon as the hooks 51 engage under the rim, the operator moves the valve handle counter clockwise, which movement first connects the inlet groove 74 with the port 72 and admits pressure to the inner end of the cylinder and subsequently connects the exhaust groove 75 with the exhaust port 70, exhausting the outer end of the cylinder at a restricted rate and permitting the piston to be moved rearwardly at a restricted rate. This moves the swinging head 47 toward the cylinder and the hooks 51 thereof engage the lower edge of the rim and break and contract it as shown in Fig. 2. When the rim is contracted, the valve is moved to neutral, shown in Fig. 6, and the tire removed. The rim may then be held in its contracted condition until the tire is repaired.

The repaired tire is then replaced about the rim, one side being supported on the arm 13 and the valve 60 is turned to move the head 47 away from the cylinder. The rim first expands due to its own spring and at the end of the expanding movement, the four shoulders formed by the cylindrical parts 40 and 50 at the ends of the swinging heads 36 and 47 engage the inner face of the rim and push it out until the rim ends abut.

The rim ends are then locked together by the usual lock provided thereon, and the head 47 is moved toward the cylinder to permit of removing the repaired tire and rim.

It is obvious that by providing swinging heads to engage the rim at their opposite ends, that these heads automatically find the tire rim and engage it at four points and as the rim contracts, these heads automatically adapt themselves to the changing form of the rim, thereby preventing warping or distorting of the rim.

When unusually wide rims are being operated on, after the rim is engaged by the lower hooks 41 and 51, the four removable hooks 45 and 53 are placed on the pins 44 and 52 of each head and properly engaged with the upper edge of the rim. This provides additional support for wide rims and avoids distortion of the same.

As a whole this invention provides a simple and efficient air tire changer which is simple and inexpensive to operate and is not liable to get out of order with constant use. It also is so designed that there is little danger of injuring the rim by distortion of the same in either expanding or contracting the same and its operation is at all times under the complete control of the operator.

I claim as my invention:

1. A tire changer including a horizontal stationary enclosed cylinder, a piston in said cylinder, a piston rod secured to said piston and projecting outwardly from said cylinder, means for introducing fluid pressure to move said piston in opposite directions, a cross head pivoted intermediate its ends for horizontally swinging movement on the outer end of said piston rod, and a second cross head similarly mounted adjacent the opposite cylinder head, each of said cross heads comprising upper and lower arms and vertical rounded parts connecting said arms at their outer ends, said rounded parts forming shoulders adapted to engage the inner side of said rim to expand the same, upwardly inturned fixed hooks pivotally mounted at the lower outer ends of each vertical rounded part, and adapted to engage the lower flange of said tire rim to contract the same and removable inturned hooks pivotally mounted at the upper outer ends of said vertical rounded parts and adapted to engage the upper flange of said rim.

2. A tire changer comprising a fixed body portion provided with laterally extending guide portions at one end thereof, rim engaging means mounted on said frame at the opposite end thereof, a rod mounted for horizontal movement parallel to the said guide portions, an open frame receiving the end of said rod, means for securing said frame at the top and bottom sides to said rod, means carried by the frame and disposed at opposite sides of the rod to engage a tire rim, means carried by the frame for engaging said guide portions to steady and guide said rod, and drive means for said rod to drive the same in either direction to expand or contract a tire rim.

3. In an air operated tire changer, a cylinder, means for mounting said cylinder in a fixed position comprising a fixed bracket extending lengthwise of the cylinder and provided with a guide, a piston operable in said cylinder, a piston rod secured to said piston and extending outwardly from said cylinder, means carried on the outer end of said cylinder for engaging a tire rim, an open frame receiving the end of said piston rod, means for securing said frame at top and bottom sides to said piston rod, means carried by the frame and disposed at opposite sides of the piston rod engage a tire rim, means carried by the frame for engaging said guide portion to steady and guide said piston rod against the unequal bending stresses as occasioned by the contracting and expanding of the rim.

In testimony whereof I hereby affix my signature.

PURLEY V. MORGAN.